Patented Jan. 9, 1951

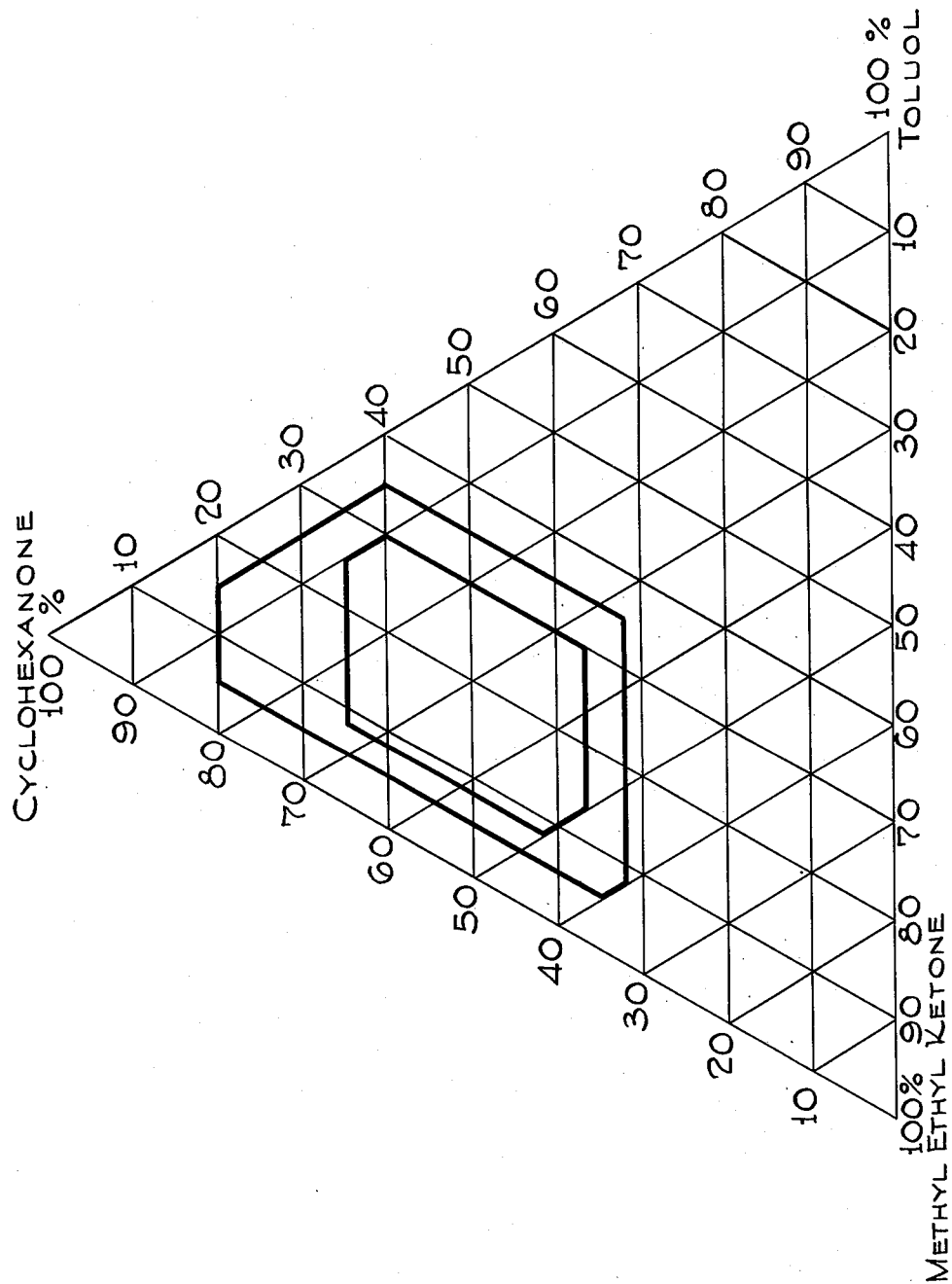

2,537,136

UNITED STATES PATENT OFFICE 2,537,136

COATING COMPOSITION

Albert C. Henn, Linden, and Albert Gathman, Elizabeth, N. J., assignors to Standard Oil Development Company, a corporation of Delaware Application February 1, 1949, Serial No. 73,916

5 Claims. (Cl. 260—32.8)

This invention pertains to coating compositions containing artificial vinyl halide resins as the film-forming ingredient. More particularly, it pertains to coating compositions containing polymerized vinyl chloride resins, dissolved in an improved, three component solvent medium.

Many artificial vinyl resins containing polymerized vinyl chloride have valuable film-forming properties by reason of their tensile strength, high softening point and chemical inertness, but are difficult to disperse as coatings of film-forming compositions by reason of the limited solubility of such resins in the available organic solvents. Some of such resins are virtually insoluble in the common organic solvents at ordinary temperatures, while sufficient amounts of others to be practical cannot be dissolved in the solvents without the solutions becoming unduly viscous or gelling.

When the resins are applied at room temperatures, the solvent is usually cyclohexanone. This solvent is expensive and coatings made with a solution of vinyl resins and cyclohexanone alone, in many cases exhibit unduly high solvent retention characteristics and unduly high water permeability. Coating compositions containing vinyl chloride resins in a coating medium consisting of cyclohexanone and an auxiliary solvent such as an aliphatic ketone also suffer from the beforementioned difficulties and in addition the resin solubility as measured by the viscosity reduction in the coating composition is insufficient for some purposes.

It has now been found that coating compositions containing a vinyl chloride resin dissolved in a three component solvent medium consisting of a volatile cyclic ketone, a volatile aliphatic ketone, and a volatile aromatic hydrocarbon, are ideally adapted to overcome the beforementioned difficulties. This is especially surprising in view of the fact that the vinyl chloride resins themselves are relatively insoluble in aromatic hydrocarbons.

The vinyl resins that may be utilized in the compositions of this invention comprise polymerized vinyl chloride resins having molecular weights in the range of about 5,000 to 50,000. These resins may be prepared by known methods, including polymerization of the vinyl chloride in solution, or in the absence of solvents or diluents. The dissolving of resins made by the latter process is the particular object of this invention, since such resins, being of high molecular weight, are extremely difficult to dissolve.

Among the volatile cyclic ketones that can be used in the three component solvent medium of this invention are such compounds, for example, cyclohexanone, methyl cyclohexanone and isophorone. It is desirable that the cyclic ketones employed boil below 250° C.

Among the volatile aliphatic ketones that can be used in the solvent medium of this invention are such compounds as, for example, mesityl oxide, methyl, ethyl ketone, methyl isobutyl ketone, methyl propyl ketone, ethyl isoamyl ketone, etc. It is desirable that the aliphatic ketones boil below 250° C. and preferably below 150° C.

Among the volatile aromatic hydrocarbons that can be utilized in the solvent medium of this invention are such compounds as, for example, toluene, benzene, and xylene. It is desirable that the aromatic hydrocarbons boil below 250° C. and preferably below 140° C.

Surfaces such as cloth, paper, glass, steel, aluminum, copper, wood, plasterboard, may be coated with the compositions of this invention. Corrosion-resistant tank and pipe linings can also be made from the solutions.

The solutions and dispersions may be employed as adhesives for textiles, metal, paper, leather and vinyl resin sheet material, especially where heat-sealing is involved.

Clear solutions containing little or no plasticizer, may be applied as wire enamels by drawing the wire one or more times through a bath containing the solution, and then baking the coated wire. The plasticized films deposited from the solutions also have good electrical resistance, and may be used for insulating parts of electrical motors, electroplating installations, cables and the like.

Formed, hollow articles, such as gloves, balloons, and the like may be fashioned from the solutions by dipping a form into the solution, removing the form and baking, and withdrawal of the article from the form.

Tests were made on the coating compositions of this invention in order to ascertain optimum concentrations of each of the components of the solvent medium and the characteristics of the resulting coatings. The results are presented in the following examples.

EXAMPLE 1

Various combinations of cyclohexanone, methyl ethyl ketone, and toluene were tested in order to ascertain the proportions of each that was necessary to give a combined solvent medium that possessed a solvency power for a polyvinyl chloride resin known by the trade name "Vinylite QYNA," at least equivalent to that of cyclohexanone the normal solvent, measured in terms of viscosity reduction. A 5% resin composition was used for this test. Results are as follows:

| | Composition in per cent by volume | | | | | |
|---|---|---|---|---|---|---|
| Cyclohexanone | 63.0 | 57.5 | 53.0 | 50.5 | 47.0 | 37.0 |
| Toluol | 29.5 | 29.5 | 28.0 | 24.5 | 21.0 | 19.0 |
| Methyl ethyl ketone | 7.5 | 13.0 | 19.0 | 25.0 | 32.0 | 44.0 |

EXAMPLE 2

When 40 vol. per cent of cyclohexanone is replaced with methyl ethyl ketone, the viscosity of a 5% polyvinyl chloride resin solution is reduced from 65.2 centistokes at 25° C. to only 40.1 centistokes. If the 40 vol. per cent of the cyclohexanone is replaced by a 28% methyl ethyl ketone and 12% toluol, the viscosity of the resulting solution is reduced to 35.2 centistokes at 25° C. Since toluol possesses the lowest cost of the three components, it is possible to formulate a blend of higher solvency than that of cyclohexanone alone at decreased cost.

The use of mixed solvent blends also enhances the physical properties of cast films of vinyl resins. This is illustrated in Examples 3 and 4.

EXAMPLE 3

The water permeability of resins cast from three component solvent blends all of equal solvency was compared with resin coatings cast from a solvent medium consisting of cyclohexanone alone. The solvency of the blends was the same as that of cyclohexanone.

*Film characteristics of polyvinyl chloride resin cast from solvent blends of equal solvency*

[System: Cyclohexanone—Methyl ethyl ketone—toluol—5% resin solvent composition (by vol.).]

| Per cent cyclohexanone | Per cent methyl ethyl ketone | Per cent toluol | Water permeability, mgms./dm.²/day |
|---|---|---|---|
| 100 | ------ | ------ | 162 |
| 63 | 7 | 30 | 31.6 |
| 50 | 25 | 25 | 38.4 |
| 40 | 42 | 18 | 56.5 |
| 44 | 48 | 8 | 32.6 |

These figures indicate that greater than a five-fold improvement was obtained through the use of the three component solvent medium of this invention.

EXAMPLE 4

Solvent retention was determined over a period of 56 hours on compositions of the same composition as employed in Example 3. The results follow:

*Solvent retention in polyvinyl chloride films*

[5% resin solvent composition (by vol.).]

| Per cent cyclohexanone | Per cent methyl ethyl ketone | Per cent toluol | Solvent content of film after drying— | | | | |
|---|---|---|---|---|---|---|---|
| | | | 6 hrs. | 7 hrs. | 13 hrs. | 36 hrs. | ¹56 hrs. |
| Per cent | Per cent | Per cent | Per cent | Per cent | Per cent | Per cent | Per cent |
| 100 | ------ | ------ | 33.2 | 31.6 | 26.8 | 26.8 | 25.0 |
| 63 | 7 | 30 | 30.2 | 28.0 | 23.2 | 22.6 | 20.6 |
| 60 | 25 | 25 | 27.8 | 27.2 | 23.8 | 24.6 | 21.8 |
| 40 | 42 | 18 | 21.4 | 20.6 | 17.0 | 17.4 | 14.4 |
| 44 | 48 | 8 | 4.0 | 3.4 | 0.2 | 1.0 | 0 |

¹ Dried over CaCl₂ for last 20 hours.

These figures indicate that a distinct improvement in solvent retention is obtained through the use of the compositions of this invention.

A particular mixture that forms solutions which yield films with polyvinyl chloride resins of enhanced water impermeability and low solvent retention as compared to straight cyclohexanone is as follows:

| | Per cent by volume |
|---|---|
| Methyl ethyl ketone | 48 |
| Cyclohexanone | 44 |
| Toluol | 8 |

In general, the proportions of the three components of the combined solvent medium adapted to yield the improved characteristics indicated above should be in the range of 30% to 80% cyclic ketones, 5% to 60% aliphatic ketones, and 5% to 35% aromatic hydrocarbons, by volume. The preferred ranges are 37% to 65% of cyclic ketone, 10% to 50% of aliphatic ketone, and 8% to 30% of aromatic hydrocarbon. The preferred proportion of vinyl chloride resins used in the coating compositions is in the range of 3% to 10%. A resin solution in this range gives a readily flowable composition. Within these ranges, higher solvency of the resins are obtainable than is gotten from cyclohexanone alone. The solutions of the resin are conveniently made up at room temperature. The general and preferred ranges of the three components of the solvent medium will be better understood by reference to the three component system diagram, Figure 1. The preferred range is shown inside the broad range.

It is to be understood that the invention is not limited to the specific examples which have been offered merely as illustrations, and that modifications may be made without departing from the spirit of the invention.

What is claimed is:

1. A coating composition consisting of a resinous homopolymer of polymerized vinyl chloride having a molecular weight in the range of 5,000 to 50,000, said homopolymer being present in an amount of about 5 weight percent, dissolved in a solvent medium consisting in combination of 44% by volume of cyclohexanone, 48% by volume of methyl ethyl ketone, and 8% by volume of toluol, said resin being present in the composition in an amount of approximately 5% by weight.

2. A coating composition comprising an artificial, vinyl chloride, resinous homopolymer as the film-forming ingredient dissolved in a solvent medium, comprising in combination a volatile cyclic ketone in an amount of 30 to 80 volume percent, a volatile aliphatic ketone in amount of 5 to 60 volume percent and a volatile aromatic hydrocarbon in an amount of 5 to 30 volume percent, said homopolymer being dissolved in a sufficient quantity of the solvent medium to make a readily flowable composition.

3. A coating composition as in claim 2 in which the proportions in the solvent medium are in the ranges of 37% to 65% of the cyclic ketone, 10% to 50% of the aliphatic ketone, and 8% to 30% of the aromatic hydrocarbon, by volume, respectively.

4. A coating composition as in claim 3 in which the cyclic ketone is cyclohexanone, the aliphatic ketone is methyl ethyl ketone, and the aromatic hydrocarbon is toluol.

5. A coating composition as in claim 4 in which the resinous homopolymer is present in an amount of 3 to 10 weight percent.

ALBERT C. HENN.
ALBERT GATHMAN.

REFERENCES CITED

The following references are of record in the file of this patent:

UNITED STATES PATENTS

| Number | Name | Date |
|---|---|---|
| 2,264,625 | Doolittle | Dec. 2, 1941 |
| 2,427,513 | Spessard | Sept. 16, 1947 |

OTHER REFERENCES

Pages 1033–1043, Industrial and Engineering Chem., vol. 35, No. 10, Oct. 1943, article by Quarles.